United States Patent
Mohagheghi et al.

(10) Patent No.: US 9,600,790 B2
(45) Date of Patent: Mar. 21, 2017

(54) DISPATCHING MOBILE ENERGY RESOURCES TO RESPOND TO ELECTRIC POWER GRID CONDITIONS

(76) Inventors: Salman Mohagheghi, Centennial, CO (US); Jean-Charles Tournier, Bellegarde (FR)

(*) Notice: Subject to any disclaimer, the term of this patent is extended or adjusted under 35 U.S.C. 154(b) by 491 days.

(21) Appl. No.: 13/820,691

(22) PCT Filed: Mar. 16, 2011

(86) PCT No.: PCT/US2011/028598
§ 371 (c)(1),
(2), (4) Date: Mar. 4, 2013

(87) PCT Pub. No.: WO2012/057846
PCT Pub. Date: May 3, 2012

(65) Prior Publication Data
US 2013/0173331 A1   Jul. 4, 2013

Related U.S. Application Data

(60) Provisional application No. 61/408,157, filed on Oct. 29, 2010.

(51) Int. Cl.
*G06Q 10/06* (2012.01)
*B60L 11/18* (2006.01)
(Continued)

(52) U.S. Cl.
CPC .... *G06Q 10/06315* (2013.01); *B60L 11/1816* (2013.01); *B60L 11/1838* (2013.01);
(Continued)

(58) Field of Classification Search
CPC ........... G06Q 10/06315; B60L 11/1816; B60L 11/1861; B60L 11/1844; B60L 11/1846;
(Continued)

(56) References Cited

U.S. PATENT DOCUMENTS 5,642,270 A   6/1997  Green
5,815,824 A   9/1998  Saga
(Continued)

FOREIGN PATENT DOCUMENTS

CN   101563253 A   10/2009
CN   101678779 A   3/2010
(Continued)

OTHER PUBLICATIONS

Frank, A., "The plug-in hybrid electric vehicle, for petroleum displacement, reduction of co2 , electric grid economics,—system implications and direct use of renewable energy," retrieved Apr. 26, 2014 from http://www.lifepo4.info/Battery_study/Articles_on_V2G/THE_PLUG-IN_HYBRID_ELECTRIC_VEHICLE_for_PETROLEUM_DISPLACEMENT_REDUCTION_OF_CO2_ELECTRIC_GRID_ECONOMICS-_SYSTEM_IMPLICATIONS_and_DIRECT_USE_OF_RENEWABLE_ENERGY.pdf.

(Continued)

*Primary Examiner* — Brian P Sweeney
(74) *Attorney, Agent, or Firm* — Taft Stettinius & Hollister LLP

(57) ABSTRACT

Systems and methods for responding to electric power grid conditions may include identifying a portion of the electric power grid for power response, identifying at least one mobile energy resource and at least one connection site, and dispatching the mobile energy resource to a connection site.

9 Claims, 1 Drawing Sheet

(51) Int. Cl.
*B60L 15/20* (2006.01)
*H02J 3/00* (2006.01)
*H02J 3/32* (2006.01)
*H02J 3/38* (2006.01)
*H02J 5/00* (2016.01)
*H02J 7/34* (2006.01)

(52) U.S. Cl.
CPC ....... *B60L 11/1842* (2013.01); *B60L 11/1844* (2013.01); *B60L 11/1846* (2013.01); *B60L 11/1848* (2013.01); *B60L 11/1861* (2013.01); *B60L 15/2045* (2013.01); *H02J 3/008* (2013.01); *H02J 3/32* (2013.01); *H02J 3/38* (2013.01); *H02J 5/00* (2013.01); *H02J 7/34* (2013.01); *B60L 2240/70* (2013.01); *B60L 2240/72* (2013.01); *B60L 2240/80* (2013.01); *B60L 2260/52* (2013.01); *B60L 2260/54* (2013.01); *B60L 2260/58* (2013.01); *Y02E 60/721* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/72* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
CPC .............. B60L 11/1838; B60L 11/1842; B60L 15/2045; B60L 11/1848; B60L 2260/52; B60L 2260/54; B60L 2240/80; B60L 2260/58; B60L 2240/72; B60L 2240/70; H02J 3/38; H02J 7/34; H02J 5/00; H02J 3/32; H02J 3/008; Y02T 10/7044; Y02T 90/169; Y02T 90/121; Y02T 10/705; Y02T 90/16; Y02T 10/7283; Y02T 10/7005; Y02T 10/7291; Y02T 90/163; Y02T 90/128; Y02T 90/14; Y02T 10/645; Y02T 10/7072; Y02T 10/72; Y04S 10/126; Y04S 30/14; Y02E 60/721
USPC ............................................................. 701/3
See application file for complete search history.

(56) References Cited

U.S. PATENT DOCUMENTS

| | | |
|---|---|---|
| 6,621,179 B1 | 9/2003 | Howard |
| 6,697,951 B1 | 2/2004 | Sinha |
| 6,907,321 B2 | 6/2005 | Kearney |
| 7,149,605 B2 | 12/2006 | Chassin |
| 7,164,211 B1 | 1/2007 | Tafoya |
| 7,478,070 B2 | 1/2009 | Fukui |
| 7,692,404 B2 | 4/2010 | Harris |
| 7,698,078 B2 | 4/2010 | Kelty |
| 7,705,487 B2 | 4/2010 | Chiquin |
| 7,715,958 B2 | 5/2010 | Kumar |
| 7,747,739 B2 | 6/2010 | Bridge |
| 7,844,370 B2 | 11/2010 | Pollack |
| 7,949,435 B2 | 5/2011 | Pollack |
| 8,019,483 B2 | 9/2011 | Keefe |
| 2001/0025209 A1 | 9/2001 | Fukui |
| 2004/0158360 A1 | 8/2004 | Garland |
| 2005/0027636 A1 | 2/2005 | Gilbert |
| 2007/0282495 A1 | 12/2007 | Kempton |
| 2008/0039979 A1 | 2/2008 | Bridges |
| 2008/0039980 A1 | 2/2008 | Pollack |
| 2008/0040223 A1 | 2/2008 | Bridges |
| 2008/0040263 A1 | 2/2008 | Pollack |
| 2008/0040295 A1 | 2/2008 | Kaplan |
| 2008/0040479 A1 | 2/2008 | Bridge |
| 2008/0052145 A1 | 2/2008 | Kaplan |
| 2008/0270023 A1 | 10/2008 | Kumar |
| 2009/0043520 A1 | 2/2009 | Pollack |
| 2009/0048716 A1 | 2/2009 | Marhoefer |
| 2009/0063680 A1 | 3/2009 | Bridges |
| 2009/0066287 A1 | 3/2009 | Pollack |
| 2009/0103341 A1 | 4/2009 | Lee |
| 2009/0115368 A1 | 5/2009 | Bullis |
| 2009/0138149 A1 | 5/2009 | Chattot |
| 2009/0174365 A1 | 7/2009 | Lowenthal |
| 2009/0187445 A1 | 7/2009 | Barclay |
| 2009/0200988 A1 | 8/2009 | Bridges |
| 2009/0210357 A1 | 8/2009 | Pudar |
| 2009/0313104 A1 | 12/2009 | Hafner |
| 2010/0013436 A1 | 1/2010 | Lowenthal |
| 2010/0017045 A1 | 1/2010 | Nesler |
| 2010/0039062 A1 | 2/2010 | Gu |
| 2010/0049533 A1 | 2/2010 | Ferro |
| 2010/0060016 A1 | 3/2010 | Hunter |
| 2010/0079004 A1* | 4/2010 | Keefe ................. B60L 11/1842 307/80 |
| 2010/0088261 A1 | 4/2010 | Montalvo |
| 2010/0106332 A1 | 4/2010 | Chassin |
| 2010/0107173 A1 | 4/2010 | Chassin |
| 2010/0112843 A1 | 5/2010 | Heichal |
| 2010/0114387 A1 | 5/2010 | Chassin |
| 2010/0138066 A1 | 6/2010 | Kong |
| 2010/0179704 A1 | 7/2010 | Ozog |
| 2010/0211340 A1 | 8/2010 | Lowenthal |
| 2010/0211643 A1 | 8/2010 | Lowenthal |
| 2010/0217550 A1 | 8/2010 | Crabtree |
| 2010/0217642 A1 | 8/2010 | Crubtree |
| 2010/0225266 A1 | 9/2010 | Hartman |
| 2010/0235004 A1 | 9/2010 | Thind |
| 2010/0277121 A1 | 11/2010 | Hall |
| 2011/0025556 A1 | 2/2011 | Bridges |
| 2011/0029148 A1 | 2/2011 | Yang |
| 2011/0035073 A1 | 2/2011 | Ozog |
| 2011/0196546 A1 | 8/2011 | Muller |
| 2011/0231028 A1 | 9/2011 | Ozog |
| 2012/0095830 A1* | 4/2012 | Contreras Delpiano ............... G06Q 30/02 705/14.49 |
| 2013/0085624 A1 | 4/2013 | Yang |
| 2013/0254151 A1 | 9/2013 | Mohagheghi |

FOREIGN PATENT DOCUMENTS

| | | |
|---|---|---|
| CN | 101828318 A | 9/2010 |
| JP | H08240435 A | 9/1996 |
| WO | 2008134114 A1 | 6/2008 |
| WO | 2009014543 A1 | 1/2009 |
| WO | 2010042550 A3 | 4/2010 |
| WO | 2010096502 A1 | 8/2010 |
| WO | 2012082173 A1 | 6/2012 |
| WO | 2013066501 A1 | 5/2013 |

OTHER PUBLICATIONS

Gage, T., "The eBox—A New EV with Li Ion Battery and V2G," retrieved Apr. 26, 2014 from http://www.lifepo4.info/Battery_study/Articles_on_V2G/The_eBox_-_A_New_EV_with_LiIon_Battery_and_V2G.pdf.

Kurani, K., Heffner, R., Turrentine, T., "Driving Plug-In Hybrid Electric Vehicles: Reports from U.S. Drivers of HEVs, converted to PHEVs, circa Jul. 2006," retrieved Apr. 28, 2014 from http://www.lifepo4.info/Battery_study/Reports/Driving_Plug-In_Hybrid_Electric_Vehicles_-_reports_from_US_drivers_of_PHEVs.pdf.

Sutanto, D., "Alternative energy resource from electric transportation," retrieved Apr. 26, 2014 from http://www.lifepo4.info/Battery_study/Articles_on_V2G/Alternative_energy_resource_from_electric_transportation.pdf.

(56) References Cited

OTHER PUBLICATIONS

Letendre, S., Perez, R., & Herig, C., "Battery-powered, electric-drive vehicles providing buffer storage for PV capacity value," retrieved Apr. 26, 2014 from http://www.lifepo4.info/Battery_study/Articles_on_V2G/Battery-POWERED_ELECTRIC-DRIVE_VEHICLES_PROVIDING_BUFFER_STORAGE_FOR_PV_CAPACITY_VALUE.pdf.
Denholm, P., Short, W., "An Evaluation of Utility System Impacts and Benefits of Optimally Dispatched Plug-In Hybrid Electric Vehicles," Technical Report NREL/TP-620-40293, retrieved Apr. 28, 2014 from http://www.lifepo4.info/Battery_study/Reports/An_Evaluation_of_Utility_System_Impacts_and_Benefits_of_Optimally_Dispatched_Plug-In_Hybrid_Electric_Vehicles.pdf.
Moura, F., "Driving energy system transformation with "vehicle-to-grid" power," IIASA Interim Report IR-06-025, retrieved Apr. 28, 2014 from http://www.lifepo4.info/Battery_study/Reports/Driving_Energy_System_Transformation_with_Vehicle-to-Grid_Power.pdf.
Short, W., Denholm, P., "A Preliminary Assessment of Plug-In Hybrid Electric Vehicles on Wind Energy Markets, Technical Report," NREL/TP-620-39729, retrieved Apr. 28, 2014 from http://www.lifepo4.info/Battery_study/Reports/A_Preliminary_Assessment_of_Plug-In_Hybrid_Electric_Vehicles_on_Wind_Energy_Markets.pdf.
Gage, T., "Final Report Development and Evaluation of a Plug-in HEV with Vehicle-to-Grid Power Flow," retrieved Apr. 28, 2014 from http://www.lifepo4.info/Battery_study/Reports/ICAT_01-2-V2G-Plug-Hybrid.pdf.
Kempton, W., Tomić, J., Letendre, S., Brooks, A., Lipman, T., "Vehicle-to-grid: battery, hybrid, and fuel cell vehicles as resources for distributed electric power in California," Institute for Transportation Studies, Paper IUCD-ITS-RR 01-03, retrieved Apr. 28, 2014 from http://www.lifepo4.info/Battery_study/Reports/Vehicle-to-Grid_Power_Battery_Hybrid_and_Fuel_Cell_Vehicles_as_Resources_for_Distributed_Electric_Power_in_California.pdf.
Sauer, D. "Technology and transition scenarios on the road to 2050—which energy carriers are needed and how to include the mobility sector," retrieved May 11, 2014 from http://www.lifepo4.info/Battery_study/Presentation/Technology_and_transition_scenarios_on_the_road_to_2050.pdf.
Innes, E., "Future impact of PHEV on utilities," PHEV 2007 Conference "Where the Grid Meets the Road", retrieved May 11, 2014 from http://www.lifepo4.info/Battery_study/Presentation/Future_impact_of_PHEVs_on_Utilities.pdf.
Kempton, W., "Vehicle to Grid Power, Briefing for: Federal Energy Regulatory Commission," retrieved May 11, 2014 from http://www.lifepo4.info/Battery_study/Presentation/V2G_-_Briefing_for_Federal_Energy_Regulatory_Commission.pdf.
Letendre, S.,"Plug-In Hybrid Electric Vehicles and the Vermont Grid: A Scoping Analysis," retrieved May 11, 2014 from http://www.lifepo4.info/Battery_study/Presentation/Plug-In_Hybrid_Electric_Vehicles_and_the_Vermont_Grid_-.pdf.
Liebman, A., & Walker, G., "Vehicle-To-Grid: Plug-In Hybrids will save the electricity system and the climate-system," retrieved May 11, 2014 from http://www.lifepo4.info/Battery_study/Presentation/V2G_-_Plug-In_Hybrids_will_save_the_electricity_system.pdf.
Bradford, T., "Vehicle to Grid (V2G): Technologies, Applications, and Economics," retrieved May 12, 2014 from http://www.lifepo4.info/Battery_study/Presentation/V2G_Technologies_Applications_and_Economics.pdf.
Denholm, P., "Plug-in Hybrid Electric Vehicles: New Load or New Resource?," UW Energy Institute Seminar Series, retrieved May 12, 2014 from http://www.lifepo4.info/Battery_study/Presentation/Plug-in_Hybrid_Electric_Vehicles_-_load_or_resource.pdf.
Kempton, W., "Vehicle to Grid Power as Wind Storage," retrieved May 12, 2014 from http://www.lifepo4.info/Battery_study/Presentation/VTG_power_as_wind_storage.pdf.
Kempton, W. & Murley, C., "Modeling V2G for a Utility with a High Wind Generation Portfolio," retrieved May 12, 2014 from http://www.lifepo4.info/Battery_study/Presentation/Modeling_V2G_for_a_Utility_with_a_High_Wind_Generation_Portfolio.pdf.
Tomić, J. & Kempton, W., "ZEVs in Vehicle-to-Grid (V2G) Applications," ZEV Symposium, CARB, retrieved May 12, 2014 from http://www.lifepo4.info/Battery_study/Presentation/tomic_ZEVs_in_Vehicle-to-Grid_V2G_Applications.pdf.
Nishinaga, E., "Vehicle to Grid (V2G) to Support BART Electrical Demand," retrieved May 12, 2014 from http://www.lifepo4.info/Battery_study/Presentation/nishinaga_-_V2G_to_support_BART_electrical_demand.pdf.
Tomić, J. and Kempton, W., "Using Electric Vehicles for Grid-Connected Storage," retrieved May 12, 2014 from http://www.lifepo4.info/Battery_study/Presentation/Using_EVs_for_Grid-Connected_Storage.pdf
Gage, T., "The Car, The Grid, The Future," retrieved May 12, 2014 from http://www.lifepo4.info/Battery_study/Presentation/The_Seattle_Electric_Vehicle_to_Grid_V2G_Forum/Gage-V2G-June05-CarGr.pdf.
Kempton, W., "Vehicle to Grid Power," retrieved May 12, 2014 from http://www.lifepo4.info/Battery_study/Presentation/The_Seattle_Electric_Vehicle_to_Grid_V2G_Forum/Kempton-V2G-June05.pdf.
Cocconi, A. and Gage, T., "Connected Cars: Battery Electrics & Plug in Hybrids," retrieved May 12, 2014 from http://www.lifepo4.info/Battery_study/Presentation/The_Seattle_Electric_Vehicle_to_Grid_V2G_Forum/CocconiGage-V2G-June05.pdf.
Kempton, W., "Automobiles: Designing the 21st century fleet," retrieved May 12, 2014 from http://www.lifepo4.info/Battery_study/Presentation/The_Seattle_Electric_Vehicle_to_Grid_V2G_Forum/Kempton-V2G-Designing-June05.pdf.
Lambert, F., "Standards for V2G Interconnection to the Grid," retrieved May 12, 2014 from http://www.lifepo4.info/Battery_study/Presentation/The_Seattle_Electric_Vehicle_to_Grid_V2G_Forum/Lambert-V2G-June05.pdf.
Letendre, S., "Public-Private Strategies to Grow a V2G Industry in Washington State," retrieved May 12, 2014 from http://www.lifepo4.info/Battery_study/Presentation/The_Seattle_Electric_Vehicle_to_Grid_V2G_Forum/Letendre-V2G-June05.pdf.
Kempton, W., "Vehicle to Grid Power," Analysis Seminar, NREL, Washington, DC, printed May 12, 2014 from http://www.lifepo4.info/Battery_study/Presentation/nrel-dc-28sep05-1.ppt.
Brooks, A., "Electric Drive Vehicles: A Huge New Distributed Energy Resource," retrieved May 12, 2014 from http://www.lifepo4.info/Battery_study/Presentation/A_Brooks_ETI_conf.pdf.
Walker, G., "Hybrid Electric Vehicles meet the Electricity Grid: Plug-in Hybrids (PHEVs) & Vehicle to Grid (V2G)," printed May 12, 2014 from http://www.lifepo4.info/Battery_study/Presentation/V2G_2_GRW.ppt.
Green Car Congress, "Xcel Energy Announces Six-Month Test of V2G and Plug-In Hybrid Electric Vehicles," retrieved May 12, 2014 from http://www.lifepo4.info/Battery_study/Press/Green_Car_Congress_Xcel_Energy_Announces_Six-Month_Test_of_V . . . pdf.
Green Car Congress, "Software Startup Targets Vehicle-to-Grid Management," retrieved May 12, 2014 from http://www.lifepo4.info/Battery_study/Press/Green_Car_Congress_Software_Startup_Targets_Vehicle-to-Grid_. . . pdf.
Smart Grid Newsletter, "Vehicle to Grid: Threat or Opportunity?," retrieved May 12, 2014 from http://www.lifepo4.info/Battery_study/Press/Vehicle_to_Grid_Threat_or_Opportunity_.pdf.
Smart Grid Newsletter, Guest Editorial, Alex Zheng, "V2G Primer for Utilities," retrieved May 12, 2014 from http://www.lifepo4.info/Battery_study/Press/V2G_Primer_for_Utilities_.pdf.
Fialka, J., "In Quest for Cleaner Energy, Texas City Touts Plug-In Car," Wall Street Journal, printed May 12, 2014 from http://online.wsj.com/news/articles/SB117487062847548559.
Letendre, S., Denholm, P., Lilienthal, P., "Electric and Hybrid Vehicles: New Load or New Resource?", Public Utilities Fortnightly, pp. 28-37, Dec. 2006.
Kempton, W. and A. Dhanju, "Electric Vehicles with V2G: Storage for Large-Scale Wind Power, " Windtech International, 2006.

(56) References Cited

OTHER PUBLICATIONS

Frank, A., "Plug-in hybrid vehicles for a sustainable future," American Scientist, vol. 95, No. 2, pp. 158-165, printed May 12, 2014 from http://www.americanscientist.org/issues/id.1021,y.2007,no.2,content.true,page.1,css.print/issue.aspx and http://www.americanscientist.org/issues/num2/2007/2/plug-in-hybrid-vehicles-for-a-sustainable-future/1.
University of Delaware, "The Grid-Integrated Vehicle with Vehicle to Grid Technology," printed May 12, 2014 from http://www.udel.edu/V2G/.
Vandael, S., Holvoet, T., Deconinck G., Kamboj, S., Kempton, W., "A comparison of two GIV mechanisms for providing ancillary services at the University of Delaware," IEEE SmartGridComm 2013 Symposium, Demand Side Management, Demand Response, Dynamic Pricing, 2013.
University of Delaware, "The Grid-Integrated Vehicle with Vehicle to Grid Technology," "Articles and Papers on GIV and Evs," printed May 12, 2014 from http://www.udel.edu/V2G/ArticlesandPapers.html.
Udo, V., "Proven at PJM: Vehicle to Grid (V2G) and Power System/Transportation Synergies," printed May 12, 2014 from http://www.energypulse.net/centers/article/article_print.cfm?a_id=1878.
Motavalli, J., "GREENTECH; The Real Power of the Prius," The New York Times, printed Jun. 24, 2014 from http://query.nytimes.com/gst/fullpage.html?res=9A00E5DC1E3FF931A3575AC0A9619C8B63.
Quong, A., "Tesla Plugs in to PG&E Research," retrieved May 12, 2014 from http://www.lifepo4.info/Battery_study/Press/RedHerring_-_Tesla_pligs_in_to_PGE_research.pdf.
The State Intellectual Property Office of the People's Republic of China, First Office Action for corresponding Chinese patent application No. 201180051226.9, Feb. 2, 2015.
Steven Hudnut, Instructions for Response to Feb. 2, 2015 First Office Action for corresponding Chinese patent application No. 201180051226.9, Jun. 15, 2015.
The Swedish Patent and Registration Office, Office Action for corresponding Swedish patent application No. 1350643-1, May 13, 2015.
A. Kellner, International Searching Authority (EPO), International Search Report and Written Opinion of the International Searching Authority for corresponding International Application No. PCT/US2011/028598, European Patent Office, mailed Jan. 26, 2012.
U. Wang, "An Electric Hybrid Truck Designed for Utility Fleets That Can Power Your Home," Jan. 24, 2012, printed Jun. 8, 2012 from http://www.forbes.com/sites/uciliawang/2012/01/24/an-electric-hybrid-truck-designed-for-utility-fleets/.
"When Grids Get Smart—ABB's Vision for the Smart Grid," 2008, ABB.
"The Smart Grid: An Introduction," U.S. Department of Energy.
"References for 'Vehicle-to-Grid' and 'Electric Vehicle Batteries,'" Last updated Sep. 10, 2008, printed Aug. 19, 2011 from http://www.spinnovation.com/sn/.
"References for 'Vehicle-to-Grid' and 'Electric Vehicle Batteries,'" Last updated Sep. 10, 2008, printed Apr. 18, 2014 from http://www.lifepo4.info/Battery_study/.
J. Tomic, W. Kempton, "Using fleets of electric-drive vehicles for grid support," Journal of Power Sources, vol. 168, 2007, pp. 459-468.
A. N. Brooks, "Final Report—Vehicle-to-Grid Demonstration Project: Grid Regulation Ancillary Service with a Battery Electric Vehicle," 2002.
W. Kempton, T. Kubo, "Electric-drive vehicles for peak power in Japan," Energy Policy, vol. 28, 2000, pp. 9-18.
A. N. Brooks, S.H. Thesen, "PG&E and Tesla Motors: Vehicle to Grid Demonstration and Evaluation Program," 2007.
M. Kintner-Meyer, "What Plug-in Hybrid-Electric Vehicles Can Do for the Grid?," 2007.
K. Parks, K. Davies, P. Denholm, T. Markel, "Plug-in Hybrid Benefits to the Xcel Energy Colorado System," 2007.
J. Tomic, "Vehicle-to-Grid Power Economics from a Fleet Perspective," 2005.
D. Hawkins, "Vehicle to Grid—A Control Area Operators Perspective," 2001.
M. Clayton, "Electric cars that pay," The Christian Science Monitor, Boston, Mass., Jul. 29, 2004, printed Nov. 19, 2007 from http://proquest.umi.com/pqdweb?did=670686481&sid=1&Fmt=3&clientId=14739&RQT=309&VName=PQD.
S. E. Letendre, W. Kempton, "The V2G Concept: A New Model for Power?—Connecting utility infrastructure and automobiles.," Public Utilities Fortnightly, Feb. 15, 2002, pp. 16-26.
"The Garage: Focus on Autos; Garage Briefs / GREEN SCENE; A two-way street with these hybrids," Los Angeles Times, Los Angeles, Calif., Apr. 28, 2007, printed Nov. 19, 2007 from http://proquest.umi.com/pqdweb?did=1261725951&sid=1&Fmt=3&clientId=14739&RQT=309&VName=PQD.
A. Brooks, T. Gage, "Integration of Electric Drive Vehicles with the Electric Power Grid—a New Value Stream," 2001.
S. Rahman, Y. Teklu, "Role of the Electric Vehicle as a Distributed Resource," IEEE Power Engineering Society Winter Meeting, 2000, pp. 528-533, vol. 1.
M. Doostizadeh, M. Khanabadi, A. Esmaeilian, M. Mohseninezhad, "Optimal Energy Management of a Retailer with Smart Metering and Plug-in Hybrid Electric Vehicle," 10th International Conference on Environment and Electrical Engineering (EEEIC), May 2011.
U.S. Appl. No. 13/991,591.
U.S. Appl. No. 13/595,053.
U.S. Appl. No. 14/199,311.
S. Mecum, "A Wish List for Residential Direct Loan Control Customers," ACEEE, 2002.
S. Grover, "Market Penetration: How to Predict the Future," ACEEE, 1998.
C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), Nov. 7-10, 2010, pp. 1-6.
W. Kempton, J. Tomic, "Vehicle-to-grid power implementation: From stabilizing the grid to supporting large-scale renewable energy," Journal of Power Sources, Dec. 8, 2004.
IEEE Xplore Abstract for C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), printed Oct. 22, 2012.
"Demand Response, An Introduction," Rocky Mountain Institute, Boulder, Colorado, Apr. 30, 2006.
X. Fang, S. Misra, G. Xue, D Yang, "Smart Grid—The New and Improved Power Grid: A Survey," 2011, from http://www.public.asu.edu/~xfang5/survey_smartgrid_2011.pdf.
IEEE Xplore Abstract for X. Fang, S. Misra, G. Xue, D Yang, "Smart Grid—The New and Improved Power Grid: A Survey," printed Apr. 25, 2014.
X. Fang, S. Misra, G. Xue, D Yang, "Smart Grid—The New and Improved Power Grid: A Survey," IEEE Communications Surveys & Tutorials, vol. 14, No. 4, Fourth Quarter 2012, pp. 944-980.
U.S. Appl. No. 14/354,267.
Turton, H. & Moura, F., "Vehicle-to-grid systems for sustainable development: an integrated energy analysis," 2007.
Bradley, T., Frank, A., "Design, demonstrations and sustainability impact assessments for plug-in hybrid electric vehicles," Renewable and Sustainable Energy Reviews, 2007.
Romm, J., "The car and fuel of the future," Energy Policy, vol. 34, Issue 17, 2006, pp. 2609-2614.
Kempton, W., Tomić, J., "Vehicle-to-grid power fundamentals: Calculating capacity and net revenue," Journal of Power Sources, vol. 144, Issue 1, 2005, pp. 268-279.
Kempton, W., Tomić, J., "Vehicle-to-grid power implementation: From stabilizing the grid to supporting large-scale renewable energy," Journal of Power Sources, vol. 144, Issue 1, 2005, pp. 280-294.

(56) References Cited

OTHER PUBLICATIONS

Kempton, W. and Letendre, S., "Electric vehicles as a new power source for electric utilities," Transportation Research Part D, vol. 2, No. 3, 1997, pp. 157-175.

Lund, H. and Kempton, W., "Integration of renewable energy into the transport and electricity sectors through V2G," Energy Policy, 2008, pp. 3578-3587.

Cromie, R., "Demand Response and Load Management Strategies for Electric Forklifts and Non-Road EV Fleets," retrieved from http://www.lifepo4.info/Battery_study/Articles_on_V2G/Electric_Forklift_and_Non-Road_EV_Fleets_-_Demand_Response_and_Load_Management_Strategies.pdf, at http://www.lifepo4.info/Battery_study/, last accessed May 13, 2014.

Danforth, J., "Plug-In Hybrid Charging in Los Angeles: Analysis of the Load-leveling Capacity for Charging Plug-in Hybrids in the Los Angeles Department of Water and Power Transmission Area," retrieved from http://www.lifepo4.info/Battery_study/Articles_on_V2G/Analysis_of_the_Load-leveling_Capacity_for_Charging_Plug-in_Hybrids_in_the_Los_Angeles_Department_of_Water_and_Power_Transmission_Area.pdf, at http://www.lifepo4.info/Battery_study/, last accessed May 13, 2014.

Kohlmann R., "From hybrid systems towards sector-spanning integration: concepts for the use of wind energy for individual transport," Second International Renewable Energy Storage Conference, Bonn, 2007.

Schluchter, C., "Die Idee des Vehicle to grid (V2G)," 2007.

Nørgaard, P., Lund, H., Mathiesen, B., "The transport sectors potential contribution to the flexibility in the power sector required by large-scale wind power integration," Nordic Wind Power Conference, Roskilde, Denmark, 2007.

Ornelas, E., "PG&E's view: PHEVs, V2G and the Progress so far," PHEV 2007 Conference "Where the Grid Meets the Road," Winnipeg, Manitoba, 2007.

Parks, K., Denholm, P. and Markel, T., "Costs and emissions associated with plug-in hybrid electric vehicle charging in the Xcel Energy Colorado service territory," National Renewable Energy Laboratory—NREL/TP-640-41410, 2007.

Penney, T., Elling, J., "The race to connect cars, communities and renewables," Geotimes, Aug. 2005 (printed May 12, 2014 from http://www.geotimes.org/aug05/feature_pluginhybrid.html).

* cited by examiner

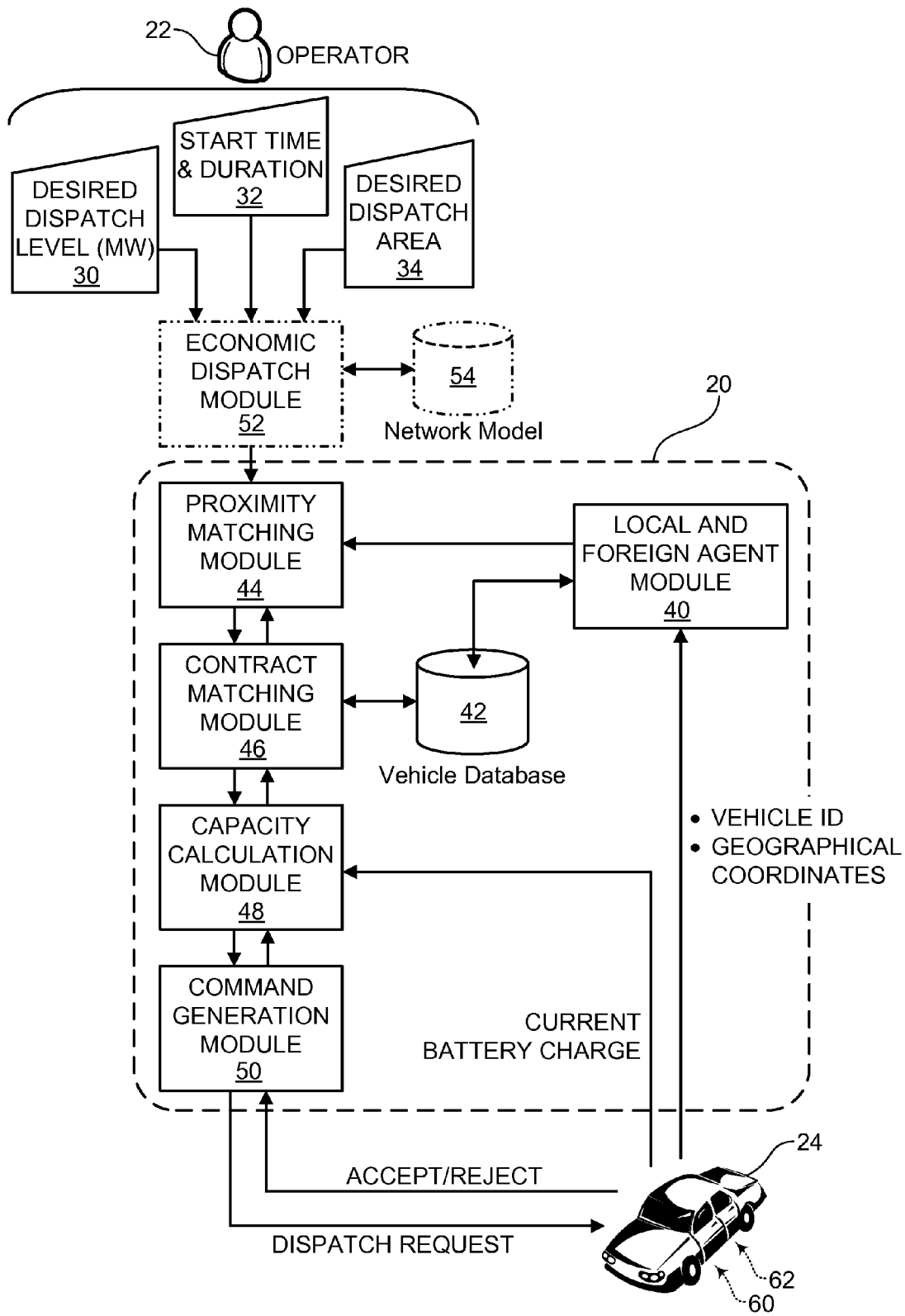

DISPATCHING MOBILE ENERGY RESOURCES TO RESPOND TO ELECTRIC POWER GRID CONDITIONS

CROSS REFERENCE TO RELATED APPLICATION(S)

This application claims the benefit of U.S. Provisional Patent Application Ser. No. 61/408,157, which was filed on Oct. 29, 2010 and is entitled "Dispatching Mobile Energy Resources to Respond to Electric Power Grid Conditions." The complete disclosure of the above-identified patent application is hereby incorporated by reference for all purposes.

FIELD OF THE DISCLOSURE

The present disclosure relates to responding to electric power grid conditions, and more particularly to dispatching mobile energy resources to respond to electric power grid conditions.

BACKGROUND

Examples of using electric vehicles to supply power to an electric power grid are disclosed in U.S. Pat. No. 5,642,270 and in U.S. Patent Application Publication Nos. 2007/0282495 and 2008/0040479. The disclosures of these and all other publications referenced herein are incorporated by reference in their entirety for all purposes.

SUMMARY

In some examples, methods for responding to electric power grid conditions may include identifying a portion of the electric power grid for a power response, identifying at least one mobile energy resource and at least one connection site, determining for the identified at least one mobile energy resource a proximity to the connection site, determining a rating for the identified at least one mobile energy resource, and dispatching the identified at least one mobile energy resource to the connection site if the rating is above a predetermined threshold. The rating may be based at least partially on the proximity to the connection site.

In some examples, methods for responding to electric power grid conditions may include identifying a portion of the electric power grid to receive a power response, determining a magnitude of desired power response, determining a mobile energy resource dispatch area based at least partially on the portion of the electric power grid, identifying a plurality of mobile energy resources proximate the dispatch area, identifying for each of the mobile energy resources a nearest one of a plurality of connection sites, determining for each of the mobile energy resources a dispatch capacity, identifying a subset of the mobile energy resources, and dispatching the mobile energy resources of the subset to the corresponding nearest ones of the connection sites. The combined dispatch capacity of the mobile energy resources in the subset may be at least as great as the magnitude of desired power response.

In some examples, a computer readable storage medium may have embodied thereon a plurality of machine-readable instructions configured to be executed by a computer processor. The plurality of machine-readable instructions may include instructions to determine a magnitude of desired power response, instructions to determine a mobile energy resource dispatch area, instructions to identify a plurality of mobile energy resources proximate the dispatch area, instructions to identify for each of the mobile energy resources a nearest one of a plurality of connection locations, instructions to determine for each of the mobile energy resources a dispatch capacity and a proximity to the nearest one of the connection locations, instructions to rank the mobile energy resources, instructions to identify a subset of the mobile energy resources, and instructions to dispatch the mobile energy resources of the subset to the corresponding nearest ones of the connection locations. The mobile energy resources may be ranked based at least partially on the proximity to the nearest one of the connection locations for each of the mobile energy resources. The combined dispatch capacity of the mobile energy resources in the subset may be at least as great as the magnitude of desired power response. The subset may include higher ranked ones of the mobile energy resources.

BRIEF DESCRIPTION OF DRAWINGS

FIG. 1 is a block diagram illustrating a nonexclusive illustrative example of a system for responding to electric power grid conditions.

DETAILED DESCRIPTION

As will be more fully set out below, mobile energy resources, such as plug-in hybrid or electric vehicles, may be integrated into an electric distribution system or power grid, such as for response to various electric power grid conditions. For example, mobile energy resources may be used for demand or power response applications, such as during a shortage of electrical power supply. In some examples, information regarding the geographical position of one or more mobile energy resources and/or their level(s) of charge may be used to evaluate possible candidates for integration into an electric power grid, such as to respond to a shortage of supply in a specific area of the power grid.

The electric distribution system, or "power grid," may refer to a power distribution system or network that connects producers of power with consumers of power. The power grid may include generators, transformers, interconnects, switching stations, and safety equipment as part of a transmission system for supplying bulk power and/or a distribution system for supplying retail power. It should be understood that the systems and methods disclosed herein may be vertically scaled, such as for use with a neighborhood, a city, a sector, a control area, or even one or more large-scale interconnects, such as one or more of the eight large-scale Interconnects in the North American Electric Reliability Council (NERC). The disclosed systems and methods may be horizontally scalable, such as for providing power services to multiple grid areas simultaneously.

"Electric power grid conditions," as used herein, may refer to the need to have more or less power flow into or out of at least a portion of the power grid. For example, electric power grid conditions may result from supply changes, demand changes, contingencies and/or failures, ramping events, or the like. In some examples, such grid conditions may manifest themselves as power grid instabilities or power quality events, which may include voltage deviations, such as under- or over-voltage events, frequency deviations, such as under- or over-frequency events, and/or other disturbances in the quality of the power delivered by the power grid, such as sub-cycle voltage spikes and harmonics.

The power supplied and/or injected into an electric power grid may be roughly grouped as base load, peak power, spinning reserves, and regulation. Base load power refers to power provided round-the-clock or 24/7. Peak power refers to power supplied at times of day when high levels of power consumption are expected, such as on hot summer afternoons. Spinning reserves refers to additional generating capacity that can be used to supply power quickly, such as within 10 minutes, upon request from the grid operator. Regulation, also referred to as automatic generation control (AGC) or frequency control, may be used to fine-tune the frequency and voltage of the grid by matching generation to load demand. In some examples, regulation may be classified as either "regulation up," which refers to the ability to increase power generation from a baseline level to prevent a voltage and frequency drop when load exceeds generation, and "regulation down," which refers to the ability to decrease power generation from the baseline.

"Power response," as used herein, refers to a response to various electric power grid conditions. It should be understood that a power response, or demand response, may encompass adding/injecting power and/or taking power from the power grid, such as by adding load and/or by storing energy.

An "energy resource," as used herein, refers to electrical entities that can be commanded or requested to provide power, take or consume power and/or store energy. To provide power, an energy resource may act as a power generator or source. To take power, an energy resource may act as a load and/or store energy. Nonexclusive illustrative examples of energy resources may include battery/charger/inverter systems for electric or hybrid vehicles, repositories of used-but-serviceable electric vehicle batteries, fixed energy storage, fuel cell generators, emergency generators, controllable loads, or the like.

As used herein, a "mobile energy resource," or "MER," may refer to an energy resource that may be dispatched to appear and/or be connected at various locations throughout the electric power grid, such as to provide a power response. The MER may itself be mobile such that it can be physically present at various geographic locations on or within the electric power grid, such as where the MER is an electric vehicle.

As used herein, "electric vehicle" should be broadly construed so as to refer to vehicles that have electrical power generation and/or storage capacity, as well as vehicles that can be connected to the power grid to recharge the vehicle's energy storage system. Thus, nonexclusive illustrative examples of "electric vehicles" include both pure electric and also hybrid electric vehicles, such as plug-in hybrid electric vehicles. Vehicle energy storage systems may include batteries, fuel cells, capacitors, or the like, or any combination thereof.

The availability of two-way communications between the utility and the end customers and/or of advanced monitoring and control capabilities, such as in the context of a Smart Grid, allows for demand or power response applications. Demand or power response applications may target reducing the peak demand in a distribution network, or parts thereof, by temporarily disconnecting end-customer loads and/or by sending request signals to the end customers to lower their electric consumption for a short period of time. From a utility's point of view, demand or power response applications may avoid the additional and/or increased costs of generation for power outside of base load. From the consumers' point of view, demand or power response applications may provide financial incentives. The presence of distributed energy resources, such as MERs, and suitable two-way communications permits utilities to perform demand or power response applications by, for example, not only requesting that end customers lower their consumption level, but also by requesting an injection back into the grid from the available resources. MERs used as distributed energy resources may be dispatched and/or classified or selected as appropriate candidates for a demand or power response application based on two varying parameters: location and dispatch capacity.

As used herein, "dispatch capacity" refers to an MER's ability to provide a power response and may correspond to a magnitude and/or duration of power response available from a particular MER. For example, when an MER is an electric vehicle, the dispatch capacity may refer to the discharge rate and/or duration available from the electric vehicle, which may be a function of the vehicle's current state of charge.

The disclosed systems and methods may provide coordinated, localized dispatch of a plurality of MERs, such as in response to a shortage of supply in a distribution network. By using the disclosed systems and methods, a utility or power supplier may respond to a power grid condition in one or more areas or portions of the power grid, which can be any portion or combination of one or more feeders, by dispatching available MERs, such as the MERs proximate the areas of the power grid.

A nonexclusive illustrative example of a system for responding to electric power grid conditions is shown generally at 20 in FIG. 1. Unless otherwise specified, the system 20 may, but is not required to, contain at least one of the structures, components, functionalities, and/or variations described, illustrated, and/or incorporated herein. Although some aspects of the following examples are discussed with reference to electric vehicles, it should be understood that the disclosed systems may utilize any suitable MER.

As will be more fully set out below, the system 20 may be activated by an operator 22 to provide a power response to electric power grid conditions, such as by dispatching an MER such as the vehicle 24. As shown in FIG. 1, the operator 22 may activate the system 20 to provide a power response by providing, as input, one or more of a desired dispatch level 30, a start time and duration 32 for the power response, and a desired dispatch area 34. The desired dispatch level 30 may specify a desired level of power generation, such as the number of megawatts (MW) for a particular power response.

The desired dispatch area 34 may refer to the geographic area from which the operator may dispatch MERs for a particular power response. A desired dispatch area may be defined using any suitable criteria, such as the proximity of the dispatch area to the area of the power grid having a power grid condition that requires a power response, the network constraints for the portions of the power grid between the desired dispatch area and the power grid area requiring a power response, the availability or presence of MERs proximate or in the desired dispatch area and/or proximate the power grid area requiring a power response, the availability of connection sites for MERs proximate or in the desired dispatch area and/or proximate the power grid area requiring a power response, or the like.

The illustrated system 20 includes a local and foreign agent module 40, an MER or vehicle database 42, a proximity matching module 44, a contract matching module 46, a capacity calculation module 48, and a command generation module 50. In some examples, the system 20 may include and/or receive input and/or data from an economic dispatch module 52 and a network model 54. Although the system 20 is illustrated in FIG. 1 with each of the modules being linked to particular other ones of the modules, it should be understood that the various modules of system 20 may receive and/or have access to the information and/or data input to, processed by, and/or output from any of the other modules of system 20.

In some examples, an MER will need to be suitably equipped to participate in a power response to be provided by the system 20. For example, an MER may need to be configured to communicate with and receive dispatch requests from the system 20. In such an example, an MER, such as the vehicle 24, may include or be provided with a suitable communications box or module 60 and control box or module 62.

The MER communications modules 60 may be configured to transmit or send information to the system 20, such as in response to signals received from the system 20. For example, the MER communications modules 60 may be configured to: send to the system 20 an indication that the MER or its owner is interested in participating in a power response, send to the local and foreign agent module 40 an MER identification (ID) and the MER's geographical coordinates, send to the capacity calculation module 48 its available dispatch capacity, and send to the command generation module 50 an acceptance or rejection of a dispatch request. In examples where the MERs are electric vehicles, the MER communications modules 60 may send a vehicle identification (ID) and the vehicle's geographical coordinates to the local and foreign agent module 40, its current battery charge and/or available discharge capacity to the capacity calculation module 48, and an acceptance or rejection of a dispatch request to the command generation module 50.

The MER communications modules 60 may be configured to receive information from the system 20. As will be more fully discussed below, the MER communications modules 60 may be configured to receive a dispatch inquiry or request from the command generation module 50.

The MER control modules 62 may be configured to control the response of the MER to a dispatch request. For example, where the MER is an electric vehicle, the MER control modules 62 may be configured to control the vehicle's power source while the vehicle is being discharged at a charging site or is otherwise providing a power response to the power grid.

In some examples, MERs that are interested in participating in a power response may register either with the utility or other entity in control of the system 20, or with an MER Aggregator, which may act as a third party service provider to the utility. The local and foreign agent module 40 may receive an MER ID and current geographical coordinates for MERs that are within range of the desired dispatch area and are configured to participate in and/or are interested in participating in a power response.

The local and foreign agent module 40 may compare the received MER IDs and/or current geographical coordinates to information in the vehicle database 42 to determine which MERs are already enrolled with the utility and/or aggregator associated with the system 20 and which MERs are not enrolled and/or are not associated with or belong to the dispatch area or the coverage area of the utility. The enrolled MERs may be identified as local agents, and the non-enrolled MERs may be identified as foreign agents. Information on the enrolled MERs may already exist in the vehicle database 42, while the information on non-enrolled MERs may be added to the database as temporary entries. In some examples, non-enrolled MERs will need to be suitably configured to notify the utility and/or aggregator of their presence proximate the area and of their interest in participating in a power response as well as their terms and conditions for such participation. As the non-enrolled MERs may be vehicles that are temporarily located proximate or in the dispatch area, or are not yet registered with the utility/aggregator, the local and foreign agent module 40 may support or allow integrating new or temporary resources into a power response in the form of non-enrolled MERs that are, or will be, proximate or in the desired dispatch area.

The proximity matching module 44 may receive data from the local and foreign agent module 40 regarding MERs proximate or in the desired dispatch area. The proximity matching module 44 may use the MER geographical data to locate and/or identify those of the MERs that are closer to the desired area and rank/shortlist those MERs according to a combination of the distance to the desired area and the MERs available dispatch capacity. By ranking the MERs, the proximity matching module 44 may enable a relatively localized power response by letting the system 20 send dispatch requests to MERs that are relatively close and have sufficient dispatch capacity, without sending dispatch requests to MERs that are very close to the desired area, but with little or no dispatch capacity, or to MERs that have a high dispatch capacity, but are relatively far from the area. When the MERs are electric vehicles, the ranking may prevent sending a dispatch request to vehicle that is very close to the desired area, but with almost dead batteries. In some examples, geographic localization of MERs may utilize the global positioning system (GPS) and/or triangulation of cellular phone or GSM antennas in situations where GPS coverage is unreliable and/or unavailable, such as in covered buildings.

The contract matching module 46 may review the terms of MER contracts regarding participation in a power response and rank or shortlist the MERs according to the terms of their contracts. For example, the contract matching module 46 may rank or shortlist electric vehicles according to the terms of their contracts available at the vehicle database 42 and based on constraints of the power response, such as start time, incentive available, duration, or the like.

The capacity calculation module 48 may calculate a dispatch duration for an MER based on the MER's available dispatch capacity and may calculate the remaining dispatch capacity after the power response. In examples where the MER is an electric vehicle, the capacity calculation module 48 may calculate the duration of discharge required from the vehicle's battery and also determine the remaining charge in the battery after the requested discharge duration based on the current charge level information for the vehicle's battery that is received from the communications module 60. In some examples, the discharge duration and/or the remaining charge information may be crosschecked by the contract matching module 46 for at least some vehicles, which may ensure that the dispatch request complies with the terms and conditions of those vehicles' contracts.

The command generation module 50 may generate a dispatch or dispatch request and send it to the MERs identified and/or selected for participation in the demand or power response. The dispatch request may include an address for and/or directions or a routing to a connection site or station, a connection start time and/or duration, and a remaining response capacity after completion of the MER's participation in the power response. For example, where the MER is an electric vehicle, the dispatch request may include an address for and/or driving directions to an electric vehicle charging site or location, a start time and/or duration for the discharge, and an estimated and/or expected remaining charge after completion of the requested discharge. The command generation module 50 may receive an accept or reject signal from the MER or the MER's owner. In some examples, the command generation module 50 may execute a loop of sending dispatch requests and receiving accept/reject signals until the accept signals indicate a power response sufficient to meet the desired dispatch level. The command generation module 50 may send a dispatch to any suitable combination of identified enrolled and/or non-enrolled MERs.

When included in the system 20, the economic dispatch module 52 may consider the MER connection locations, or electric vehicle charge/discharge stations, within a specific area of a distribution network as a virtual distributed or dispersed generation (DG) unit capable of injecting energy into the distribution network. In such examples, the system 20, such as by way of the economic dispatch module 52, may be configured to minimize and/or prevent violation of various network constraints as a result of the power response. For example, the particular MERs selected to provide a particular power response may be selected based not only on their proximity to the dispatch area, but also in view of the network constraints between the MER and the dispatch area. Nonexclusive illustrative examples of network constraints include maintaining the magnitude and phase angle of the bus voltages within acceptable ranges, such as within about 5% of nominal or rated value, maintaining line flows and currents so as to not exceed the thermal limits of lines, maintaining balanced loads, and the like. Consideration of network constraints by the system 20 may reduce or prevent the network constraint violations that may result from an overly localized dispatch of multiple MERs, in which the dispatched MERs are connected to the grid within a relatively small area.

The following paragraphs describe nonexclusive illustrative examples of methods for responding to electric power grid conditions, using the concepts and components disclosed herein. Although the actions of the disclosed methods may be performed in the order in which they are presented below, it is within the scope of this disclosure for the actions, either alone or in various combinations, to be performed before and/or after any of the other actions. Further, although some aspects of the following examples are discussed with reference to electric vehicles, it should be understood that the disclosed methods may utilize any suitable MER.

A method for responding to electric power grid conditions may include identifying a portion of the electric power grid for power response, identifying at least one MER and at least one connection site or location suitable for use with the MER, and dispatching the MER to one of the identified connection sites. Some examples of the disclosed methods may include one or more additional actions, functions and/or features, such as those set out below.

Some examples of the disclosed methods may include determining or identifying a nearest one of the connection sites for each of the MERs. For example, at least some of the MERs could be dispatched to the corresponding nearest ones of the connection sites. The nearest one of the connection sites for a particular MER could be determined based on the proximity of that MER to the various connection sites. As used herein, the proximity of an MER to a connection site may refer to a distance from the MER's current location to the connection site and/or an estimated travel time to the connection site. The distance from an MER's current location to a connection site may refer to an absolute distance and/or to a travel or driving distance, such as where the MERs are electric vehicles.

Some examples of the disclosed methods may include determining an MER dispatch area and identifying a plurality of MERs that are in or proximate the dispatch area. The MER dispatch area may be based at least partially on the portion of the electric power grid for which a power response is desired. The identified MERs and/or the identified MER connection sites may be proximate the portion of the electric power grid.

Some examples of the disclosed methods may include identifying or selecting a subset of the MERs for dispatch to provide or contribute to a power response. For example, a magnitude of desired power response may be determined for a given electric power grid condition, and the subset of the MERs may be determined such that the collective or combined dispatch capacity of the MERs in the subset is at least as great as the magnitude of desired power response.

Some examples of the disclosed methods may include determining a rating for at least one identified MER and dispatching at least some of the rated MERs to a connection site if the rating is above a predetermined threshold. The rating for a particular MER may be based at least partially on an available dispatch capacity determined for the MER and/or the MER's proximity to at least one connection site, which may be the nearest one of the connection sites. For example, an MER that has a relatively high available dispatch capacity and is also relatively close to at least one connection site may be given a relatively higher rating. However, a relatively lower rating may be given to an MER that has a relatively high available dispatch capacity but is relatively far from any of the connection sites or that has a relatively low available dispatch capacity, despite being close to at least one connection site.

The predetermined threshold for the rated MERs may be established by the utility or the operator. The predetermined threshold may be arbitrarily set or it may be a function of the type and/or number of MERs available, the type of desired power response, the network constraints, or the like. In some examples, the predetermined threshold and/or the MER ratings may be such that the dispatched MERs are relatively close to the dispatch area and have a relatively high available dispatch capacity.

Some examples of the disclosed methods may include ranking at least some of the MERs based on one or more predetermined criteria. For example, each of the MERs may be ranked based at least partially on its dispatch capacity and/or on its proximity to the nearest one of the connection sites. In some examples, one of the dispatch capacity and proximity to the nearest one of the connection sites may be weighted more heavily in determining the ranking. For example, the network constraints for certain areas of the power grid may be such that a power response to a power grid condition in those areas should utilize MERs that are relatively close to the area. In examples where the MERs are ranked, the subset of the MERs identified and/or selected for participation in the power response may include the higher ranked ones of the MERs.

The power response provided by the disclosed methods may be in the form of an injection of electric power from at least one MER. In some examples, at least some of the MERs may be vehicles that include an electrical energy source, while the connection sites may be configured to selectively receive power from the electrical energy source. For example, at least some of the MERs may be electric vehicles, such as plug-in or hybrid electric vehicles, with at least some of the connection sites being charging locations connected to the power grid and configured for use with electric vehicles. Thus, dispatching an MER to a connection site may include sending to an electric vehicle a discharge duration or set-point, driving directions to a charging location, and/or information regarding the vehicle's estimated remaining charge after the completion of the requested discharge. As may be understood, the discharge duration sent to a particular electric vehicle may be at least partially based on the dispatch capacity for that vehicle, which may be a function of the available discharge capacity for the vehicle and/or its batteries or other energy source at the time of dispatch.

In some examples, the power response may be in the form of a load added to a particular area of the power grid by the MER. For example, an MER may be dispatched to a particular connection site to have the MER's energy source recharged from the power grid.

Some examples of the disclosed methods may include providing incentives for compliance with the dispatch and/or imposing penalties for noncompliance with the dispatch. For example, the dispatch for a given MER may be in the form of a request that the MER proceed to, and connect with, a particular connection site. If the MER responds to the request and/or complies with the dispatch, the MER may receive an incentive for the compliance. The incentive provided and/or rewarded to a particular MER for compliance with a particular dispatch may be a function of whether or not the MER is enrolled or non-enrolled, and upon the terms of any contract that may be in place, such as between the owner of the MER and the utility or MER aggregator.

The incentives may be based on providing a service to the power grid by participating in a power response by supplying and/or taking power from the grid. Nonexclusive illustrative example of incentives, which may vary amongst various MERs and power grid owners or operators and may be contract-specific, may include providing payment or other credit to the MER or its owner for power supplied to the grid and discounted rates for power taken from the grid as part of a power response. Incentives may include a single lump payment or credit for a given period of time of provided power response or payment or credit at a particular rate per kilowatt-hour (kWh) provided during the power response. The rates associated with a particular incentive may vary or be adjusted based on factors such as time of day and/or the particular power grid conditions. In some examples, the rates may be adjusted up or down based on the accept/reject rate for a particular dispatch request, such as to achieve a desired level of MER acceptance of dispatch requests.

In some examples, a penalty may be imposed on an MER or its owner if the MER does not respond to a dispatch request and/or fails to comply with the dispatch. Whether or not a penalty is imposed on a particular MER, and the type and/or scope of the imposed penalty, may be a function of whether or not the MER is enrolled or non-enrolled, and upon the terms of any contract that may be in place. For example, an enrolled MER may receive a fine or deduction against future payments if it does not respond to a dispatch request and/or fails to comply with the dispatch. In some examples, such as for non-enrolled MERs, for which a power response contract may not be in place, or for enrolled MERs with appropriate contract terms, the penalty may be limited to non-payment for noncompliance with a particular dispatch.

In some examples, incentives may be available where an MER is made available to participate in a power response, but without actually supplying and/or taking power from the grid. In particular, some MERs may receive an incentive for acting in a role similar to a spinning reserve. For example, an MER or its owner may be paid for a period of time during which the MER's owner agrees to make the MER available to provide a power response, regardless of whether the MER actually provides and/or takes power from the grid. However, in such an arrangement, a penalty may be assessed if the MER does not respond to a dispatch during the period of time when the MER was to be made available to provide a power response.

The disclosed methods and systems may be embodied as or take the form of the methods and systems previously described, as well as of a transitory or non-transitory computer readable medium having computer-readable instructions stored thereon which, when executed by a processor, carry out operations of the disclosed methods and systems. The computer-readable medium may be any medium that can contain, store, communicate, propagate, or transport the user-interface program instruction for use by or in connection with the instruction execution system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method for operating a response system for responding to electric power grid conditions, the response system having a controller and a database, the method comprising:

identifying a portion of an electric power grid for a power response;
identifying, based at least on data from a database, a plurality of mobile energy resources;
identifying, by the controller, at least one connection site;
determining, by the controller, for each of the identified plurality of mobile energy resources a proximity to the at least one connection site;
determining, using at least data for the plurality of mobile energy resources, for each of the identified plurality of mobile energy resources a dispatch capacity;
determining, by the controller, a rating for each of the identified plurality of mobile energy resources, wherein the rating is based partially on the proximity to the identified at least one connection site and partially on the dispatch capacity;
selecting, by the controller, based on the determined rating, one or more mobile energy resources from the plurality of mobile energy resources;
dispatching the selected one or more mobile energy resources to the at least one connection site such that upon (1) traveling to the at least one connection site and (2) connecting to the identified at least one connection site the selected one or more mobile energy resources feed power into or receive power from the power grid.

2. The method of claim 1, wherein the selected one or more mobile energy resources and the identified at least one connection site are proximate the portion of the electric power grid.

3. The method of claim 1, wherein the power response comprises an injection of electric power from the selected one or more mobile energy resources.

4. The method of claim 1, wherein the identified plurality of mobile energy resources are vehicles comprising an electrical energy source and the identified at least one connection site is configured to selectively receive power from the electrical energy source.

5. The method of claim 4, wherein the identified plurality of mobile energy resources are plug-in electric vehicles and the identified at least one connection site is a charging location configured for use with the plug-in electric vehicle.

6. The method of claim 5, wherein dispatching the selected one or more mobile energy resources to the connection site includes sending to the selected one or more mobile energy resources a discharge duration and driving directions to the at least one charging location.

7. The method of claim 6, wherein the dispatch capacity corresponds to an available discharge capacity for the plug-in electric vehicle, and the discharge duration is at least partially based on the available discharge capacity.

8. The method of claim 1, wherein dispatching the selected one or more mobile energy resources to the at least one connection site includes sending a request that the selected one or more mobile energy resources be connected to the identified at least one connection site, and the method further comprises providing an incentive for compliance with the request.

9. The method of claim 8, comprising imposing a penalty on at least some of the selected one or more mobile energy resources for noncompliance with the request.

* * * * *